C. W. LARNER.
VALVE.
APPLICATION FILED APR. 29, 1919.

1,339,114.

Patented May 4, 1920.

WITNESS:
Rob't R. Kitchel.

INVENTOR
Chester W. Larner
BY
Augustus B. Stoughton
ATTORNEY.

UNITED STATES PATENT OFFICE.

CHESTER W. LARNER, OF PHILADELPHIA, PENNSYLVANIA.

VALVE.

1,339,114.  Specification of Letters Patent.  Patented May 4, 1920.

Application filed April 29, 1919. Serial No. 293,477.

*To all whom it may concern:*

Be it known that I, CHESTER W. LARNER, a citizen of the United States, residing at Philadelphia, in the county of Philadelphia and State of Pennsylvania, have invented certain new and useful Improvements in Valves, of which the following is a specification.

This invention relates to fluid pressure operated plungers, and particularly to such plungers carrying integrally a piston and a valve mating with a seat rigid with the plunger casing.

In such plungers it is often desirable to hold the valve tightly to its seat against unseating pressure on the valve face and at the same time to prevent leakage of the holding pressure at the piston.

A sufficiently tight packing of the ordinary kind between the plunger and the cylinder walls would seriously impede the movements of the plunger and due to strains and distortion of the parts and temperature variations in length, it is impossible in practice to tightly seat both the valve and the piston simultaneously.

The object of this invention is to provide a construction in which the plunger will be free to move in its cylinder and which will be tightly packed against leakage at extreme closed position. A further object of the invention is to provide seating means which will be self alining and held tight by the fluid pressure on the valve plunger and which will automatically accommodate itself to relative distortions of the mating parts and variations in the spacing of the parts from the main valve and valve seats, so that tight leakproof fitting is surely and simultaneously made and maintained at both the valve and the piston head.

Figure 1:
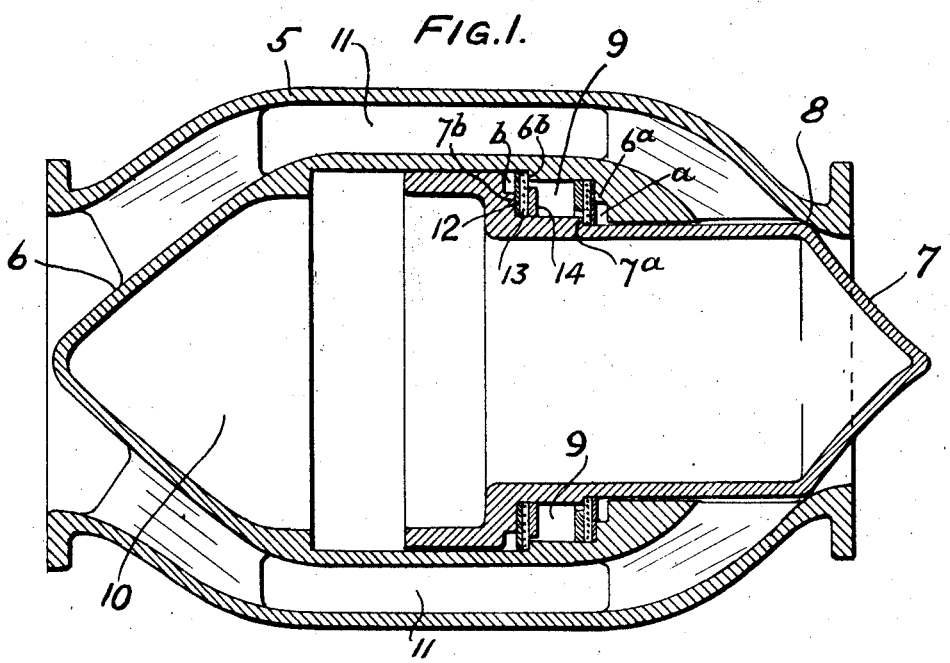
Figure 1, is a view principally in longitudinal section of a valve embodying my improvements.

In the drawings 5, represents a valve body or housing which may be an enlargement of a conduit or pipe line, 6, indicates a fixed hollow valve element and 7, is a complemental telescopic plunger for which, as is usual, an annular seat 8, is provided at the neck of the housing.

Plunger 7, is reduced in diameter throughout a portion of its length so as to form with the fixed element 6, an annular chamber 9. Plunger 7, in combination with fixed element 6, also forms an inner chamber 10. Chambers 9 and 10, which are used for the application of pressure to move the plunger 7, may be subjected to either full pipe line pressure or atmospheric pressure by means of control piping not shown. The numeral 11, indicates the main fluid or gas passage through the valve.

When the pipe line is under pressure and plunger 7, is closed, plunger 7, is held closed by maintaining pressure in chamber 10, and exhausting pressure from chamber 9. If therefore it is desired to prevent leakage out of chamber 9, through the control valve it is necessary, to prevent leakage from chamber 10, into chamber 9. Also, since passage 11, is likewise under pressure it is necessary to prevent leakage from passage 11, into chamber 9.

To tightly seal the chamber 9, the casing 6, is formed with shoulders $6^a$ and $6^b$ and the valve plunger 7, with coöperating shoulders $7^a$ and $7^b$. Direct coöperation between these shoulders cannot in practice be attained due to irregularities and variations in the parts which would not permit these shoulders and the valve 7, and seat 8, to simultaneously make perfect fit at all points. In order to form simultaneous leakproof seats at all the valve and piston surfaces the valve 7, is permitted to accurately and tightly seat, and seat and sealing means is provided at the piston to yieldingly accommodate itself to varying relative positions of the shoulders $6^a$, $6^b$, and $7^a$, $7^b$, and so formed as to make a tight seal under the fluid pressure on the plunger, irrespective of the exact relative position of the parts. The shoulders $6^a$ and $7^b$, are cut away at $a$ and $b$, respectively and a flexible metal ring 12, Fig. 1, and a leather ring 13, are fastened to plunger 7, by means of a retaining ring 14. The supporting surface of plunger 7, comes in contact with only part of the area of flexible ring 12, thereby allowing the remainder or outer portion of flexible ring 12, to overhang and be free to spring. Leather ring 13, which is fastened to and supported by flexible ring 12, comes in contact with a circular seat or shoulder $6^b$, thus preventing leakage to chamber 9. If leather ring 13, comes in contact with seat $6^b$, just before plunger 7, makes rigid contact at valve seat 8, the flexible ring 12, will spring backward and allow plunger 7, to complete its stroke, A similar combination of flexible ring, leather ring and retaining ring is shown to prevent leakage from passage 11, to chamber 9. In this case the flexible ring, leather ring and retaining ring are fastened to fixed valve element 6, to make contact with a seat 7ª, on plunger 7. The operation is the same as described above.

Figure 2:
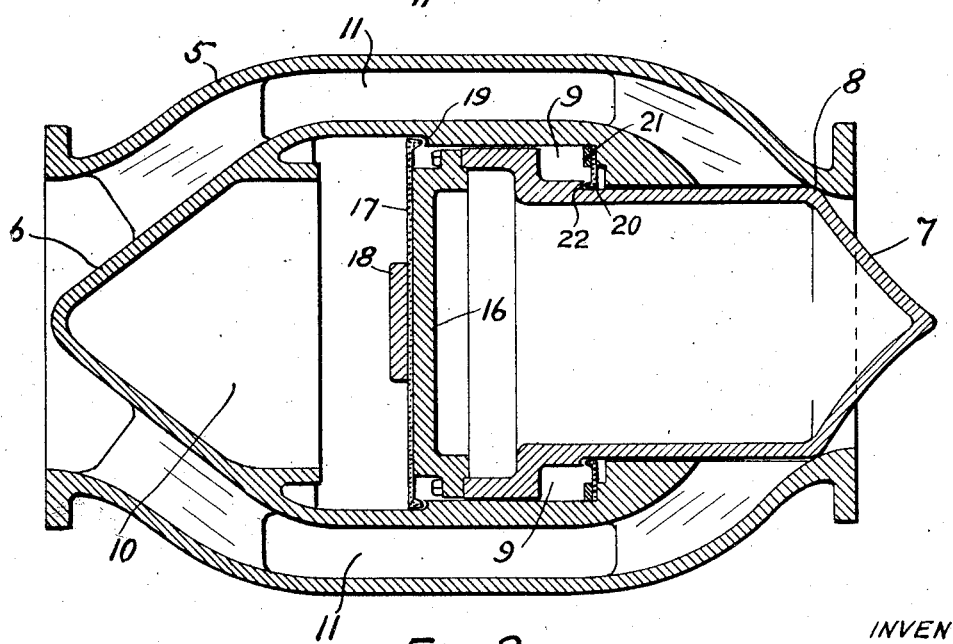
Fig. 2, is a modification showing the use of a different packing.

Fig. 2, shows a modification and eliminates the use of leather or packing of a similar nature. A head 16, is shown fastened rigidly to large end of plunger 7. A flexible disk 17, is fastened to head 16, by means of plate 18, and makes contact with seat 19, in fixed valve element 6. The purpose of contact at seat 19, is to prevent leakage from chamber 10, to chamber 9.

Similarly a flexible ring 20, is fastened to fixed valve element 6, by means of retaining ring 21, and makes contact with seat 22, in plunger 7. The purpose of contact at seat 22, is to prevent leakage from passage 11, to chamber 9. The operation of flexible disk 17, and flexible ring 20, is the same as that described for Fig. 1, except that a ground metal to metal contact is depended upon at seats 19, and 22, to stop leakage instead of leather to metal contact shown in Fig. 1.

I claim:

1. In a valve of the type recited the combination of fixed and movable valve parts having between them a valve seat to stop flow through the valve and having inside the valve body cylindrical and annular chambers between which there is established a difference of pressure for operating the valve, opposed shoulders on the valve parts with the annular chamber between the shoulders, and spring rings projecting respectively from the fixed and movable valve parts and adapted to coöperate with said shoulders independently of the position of the valve parts as fixed by contact at the valve seat.

2. In a valve of the type recited the combination of fixed and movable valve parts having between them a valve seat to stop flow through the valve and having inside of the valve body cylindrical and annular chambers between which there is established a difference of pressure for operating the valve, opposed shoulders on the valve parts with the annular chamber between the shoulders, spring rings projecting respectively from the fixed and movable valve parts and adapted to coöperate with said shoulders independently of the position of the valve parts as fixed by contact at the valve seat, and packing interposed between the shoulders and rings.

CHESTER W. LARNER.